US012123225B2

(12) United States Patent
Vinnakota et al.

(10) Patent No.: US 12,123,225 B2
(45) Date of Patent: Oct. 22, 2024

(54) METHOD AND SYSTEM FOR LOCKING AND UNLOCKING

(71) Applicant: Carrier Corporation, Palm Beach Gardens, FL (US)

(72) Inventors: Vinay Kumar Vinnakota, Telangana (IN); Sunil Kumar Bali, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 2 days.

(21) Appl. No.: 17/252,551

(22) PCT Filed: Aug. 24, 2020

(86) PCT No.: PCT/IB2020/057902
§ 371 (c)(1),
(2) Date: Dec. 15, 2020

(87) PCT Pub. No.: WO2021/053435
PCT Pub. Date: Mar. 25, 2021

(65) Prior Publication Data

US 2022/0213720 A1 Jul. 7, 2022

(30) Foreign Application Priority Data

Sep. 20, 2019 (IN) ............................ 201911038084

(51) Int. Cl.
*E05B 73/00* (2006.01)
*B65D 55/02* (2006.01)
(Continued)

(52) U.S. Cl.
CPC .......... *E05B 73/0041* (2013.01); *B65D 55/02* (2013.01); *E05B 47/0001* (2013.01);
(Continued)

(58) Field of Classification Search
CPC ............ E05B 73/0017; E05B 73/0023; E05B 73/0029; E05B 73/0041; E05B 47/0001;
(Continued)

(56) References Cited

U.S. PATENT DOCUMENTS

| | | | |
|---|---|---|---|
| 6,050,622 | A | 4/2000 | Gustafson |
| 6,373,786 | B1 | 4/2002 | Kagan et al. |

(Continued)

FOREIGN PATENT DOCUMENTS

| | | | |
|---|---|---|---|
| CN | 106428978 A | 2/2017 | |
| CN | 108455068 A | 8/2018 | |

(Continued)

OTHER PUBLICATIONS

E-Pill; "Pill Timer. Easy to Set. Automatically Records Last Opened Day and Time Indicator. Up to 24 Auto-Repeating Daily Alarms."; Amazon.com; Date First Available: Apr. 12, 2011; 9 pages; https://www.amazon.com/Automatically-Records-Indicator-Auto-Repeating-Included/dp/B004W8EQC4/ref=sr_1_6?keywords=rx+timer+cap&qid=1566037061&s-gateway&sr=8-6.

(Continued)

*Primary Examiner* — Christopher J Boswell
(74) *Attorney, Agent, or Firm* — CANTOR COLBURN LLP

(57) ABSTRACT

Aspects of the invention are directed towards a system and a method for locking an item. The item is locked in a housing comprising cavity for receiving the item. The housing comprises an electronic circuit for receiving a command from a user terminal to lock or unlock an item in the cavity of the housing. A motor resides in the housing which is actuated by the electronic circuit based on the command received from the user terminal. The housing further comprises a housing lock to lock or unlock the item on actuation of the motor.

11 Claims, 8 Drawing Sheets

(51) Int. Cl.
*E05B 47/00* (2006.01)
*G07C 9/00* (2020.01)

(52) U.S. Cl.
CPC ...... *E05B 47/0004* (2013.01); *E05B 73/0023* (2013.01); *E05B 2047/0016* (2013.01); *E05B 2047/0058* (2013.01); *E05B 2047/0095* (2013.01); *G07C 9/00309* (2013.01); *G07C 2009/00642* (2013.01)

(58) Field of Classification Search
CPC ............ E05B 47/0003; E05B 47/0004; E05B 2047/0016; E05B 2047/0058; E05B 2047/0095
See application file for complete search history.

(56) References Cited

U.S. PATENT DOCUMENTS

| | | | | |
|---|---|---|---|---|
| 7,270,353 | B2 | 9/2007 | Sironi et al. | |
| 7,336,170 | B2 | 2/2008 | Auerbach et al. | |
| 7,486,188 | B2 | 2/2009 | Van Alstyne | |
| 7,898,422 | B2 | 3/2011 | Puccini | |
| 8,830,076 | B2 | 9/2014 | Smith et al. | |
| 8,854,225 | B2 | 10/2014 | Johnson | |
| 8,960,559 | B2 | 2/2015 | Chakravarty et al. | |
| 9,361,780 | B2 | 6/2016 | Burke, Jr. et al. | |
| 9,472,073 | B2 * | 10/2016 | Yang | E05B 73/0041 |
| 9,511,910 | B2 | 12/2016 | Puccini | |
| 9,901,515 | B2 | 2/2018 | Roberts et al. | |
| 10,028,887 | B2 | 7/2018 | Tobescu | |
| 10,112,754 | B2 | 10/2018 | Roucou | |
| 10,180,018 | B1 | 1/2019 | Simpson et al. | |
| 10,194,295 | B2 | 1/2019 | Agostinelli et al. | |
| 10,204,296 | B2 | 2/2019 | Clere et al. | |
| 10,253,529 | B1 * | 4/2019 | McGinn | E05B 47/0001 |
| 10,293,995 | B2 | 5/2019 | Anderson et al. | |
| 10,358,272 | B2 | 7/2019 | Brotzel et al. | |
| 10,940,984 | B2 * | 3/2021 | Ponticelli, Sr. | E05B 47/0001 |
| 11,008,776 | B2 * | 5/2021 | Testa | E05B 47/0012 |
| 11,619,073 | B2 * | 4/2023 | Piccoli | E05B 73/0052 70/57.1 |
| 2005/0237205 | A1 * | 10/2005 | Gorst | E05B 73/0041 340/572.9 |
| 2009/0152230 | A1 * | 6/2009 | Belden, Jr. | E05B 73/0017 215/221 |
| 2013/0019784 | A1 | 1/2013 | Yang | |
| 2017/0030109 | A1 | 2/2017 | Duncan et al. | |
| 2019/0065924 | A1 | 2/2019 | Nooner | |
| 2019/0127121 | A1 | 5/2019 | Salcido Pinera | |
| 2021/0131147 | A1 * | 5/2021 | Nollman | E05B 73/00 |
| 2021/0148157 | A1 * | 5/2021 | Muniz | E05B 47/0001 |
| 2022/0063883 | A1 * | 3/2022 | Mott | B65D 55/02 |

FOREIGN PATENT DOCUMENTS

| | | | |
|---|---|---|---|
| CN | 110185338 | A | 8/2019 |
| EP | 2769927 | A1 | 8/2014 |
| EP | 3271882 | B1 | 5/2019 |
| FR | 2667576 | B1 | 1/1993 |
| WO | 2012131144 | A1 | 10/2012 |
| WO | 2017199255 | A1 | 11/2017 |
| WO | 2018200759 | A1 | 11/2018 |
| WO | 2019151835 | A1 | 8/2019 |

OTHER PUBLICATIONS

International Search Report for International Application No. PCT/IB2020/057902; International Filing Date: Aug. 24, 2020; Date of Mailing: Nov. 25, 2020; 4 pages.

Liu et al; "A Versatile Flexible UHF RFID Tag for Glass Bottle Labelling in Self-Service Stores"; IEEE Access—Special Section on Radio Frequency Identification and Security Techniques, vol. 6; Oct. 31, 2018; pp. 59065-59073.

Written Opinion for International Application No. PCT/IB2020/057902; International Filing Date: Aug. 24, 2020; Date of Mailing: Nov. 25, 2020; 5 pages.

Japanese Office Action for Application No. JP 2020-572502, Issued Apr. 2, 2024, 7 Pages.

* cited by examiner

METHOD AND SYSTEM FOR LOCKING AND UNLOCKING

CROSS REFERENCE TO RELATED APPLICATIONS

This application is a National Stage application of PCT/IB2020/057902, filed Aug. 24, 2020, which claims the benefit of IN application Ser. No. 20/191,1038084, filed Sep. 20, 2019, both of which are incorporated by reference in their entirety herein.

TECHNICAL FIELD OF INVENTION

The present invention generally relates to locks. More particularly, the invention relates to a system and a method for locking and unlocking of an item coupled to a lock.

BACKGROUND OF THE INVENTION

When a manufacturer produces any product, the product may be packed in an item. The item is generally transported from a place of the manufacturer to several retail stores where the item can be sold to an end consumer. Before the item reaches the end consumer, the item can be opened by unauthorized users and the contents of the item may be accessed. The unauthorized user can mix the contents present in the item with some adulterated content to reduce the quality of the product, or may consume the content in the item, or may take out the original product in the item to put counterfeit product in the item.

Several solutions have been proposed over time through the years to prevent access of the contents of an item by a person. One possible solution is to employ a few personnel who can secure the contents in the item from the unauthorized access/usage before the item reaches the end consumer. Another solution may involve usage of camera/s in a transportation unit through which the item is transported to the retail stores. Further, location tracking of the items have been employed. However, the existing solutions do not provide any effective mechanism that prevents the content of the item to be secured from any unauthorized access/usage before the item reaches the end consumer.

In view of the afore-mentioned problems in the existing solutions, there is a need of an efficient and an effective system and a method for preventing content of an item from any unauthorized access/usage before the item reaches an end consumer. There is also a need for restricting any person from tampering the content of an item. There is also a requirement for maintaining integrity of contents inside an item till the item reaches an end consumer. In order to solve the problems in the existing solutions, a system and a method are disclosed.

SUMMARY OF THE INVENTION

Various embodiments of the invention describe a housing comprising a cavity adapted to receive an item inside the housing. The housing comprises an electronic circuit for receiving a command from a user terminal to lock or unlock an item in the cavity of the housing. A motor inside the housing is actuated by the electronic circuit based on the command received from the user terminal. The housing further comprises a housing lock which is adapted to lock or unlock the item in the cavity on actuation of the motor.

In an embodiment of the invention, the housing lock comprises a perforation to receive the shaft of the motor for locking the item.

In another embodiment of the invention, the command is a lock or unlock command received from the user terminal through a short-range network.

In yet another embodiment of the invention, the user terminal transmits the command to lock the housing when a user of the user terminal transmits the lock command from a user application.

In still another embodiment of the invention, the shaft of the motor is disengaged from the perforation on receiving an unlock command from the user terminal.

In another embodiment of the invention, the shaft of the motor is engaged with the perforation on receiving a lock command from the user terminal.

In a different embodiment of the invention, the motor is a stepper motor.

In another embodiment of the invention, the housing lock is rotated in anticlockwise direction and then the shaft of the motor is engaged with the perforation on receiving the lock command.

In yet another embodiment of the invention, the housing lock is rotated in clockwise direction after the shaft of the motor is disengaged from the perforation on receiving the unlock command.

In another embodiment of the invention, the shaft is movably connected in vertical direction relative to the housing lock.

In a different embodiment of the invention, the housing further comprises a battery to power the electronic circuit and the motor.

In a further embodiment of the invention, the user terminal for locking the item is different from the user terminal for unlocking the item.

In a different embodiment of the invention, a method is disclosed for locking or unlocking an item in a housing. The method comprises receiving an item inside a cavity of the housing. The method further comprises receiving a command by an electronic circuit from a user terminal to lock or unlock an item in the cavity of the housing. A motor is actuated by an electronic circuit based on the command received from the user terminal. The item is locked or unlocked in the cavity on actuation of the motor.

In another embodiment of the invention, the housing lock comprises a perforation to receive the shaft of the motor for locking the item.

In yet another embodiment of the invention, the user terminal transmits the command to lock the housing when a user of the user terminal transmits a lock command from a user application.

In still another embodiment of the invention, the shaft of the motor is disengaged from the perforation on receiving an unlock command from the user terminal.

In another embodiment of the invention, the shaft of the motor is engaged with the perforation on receiving a lock command from the user terminal.

In yet another embodiment of the invention, the housing lock is rotated in anti-clockwise direction and then the shaft of the motor is engaged with the perforation on receiving the lock command.

In further embodiment of the invention, the housing lock is rotated in clockwise direction after the shaft of the motor is disengaged from the perforation on receiving the unlock command.

In another embodiment of the invention, the user terminal for locking the item is different from the user terminal for unlocking the item.

This summary is provided to introduce a selection of concepts in a simplified form from those that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1A:
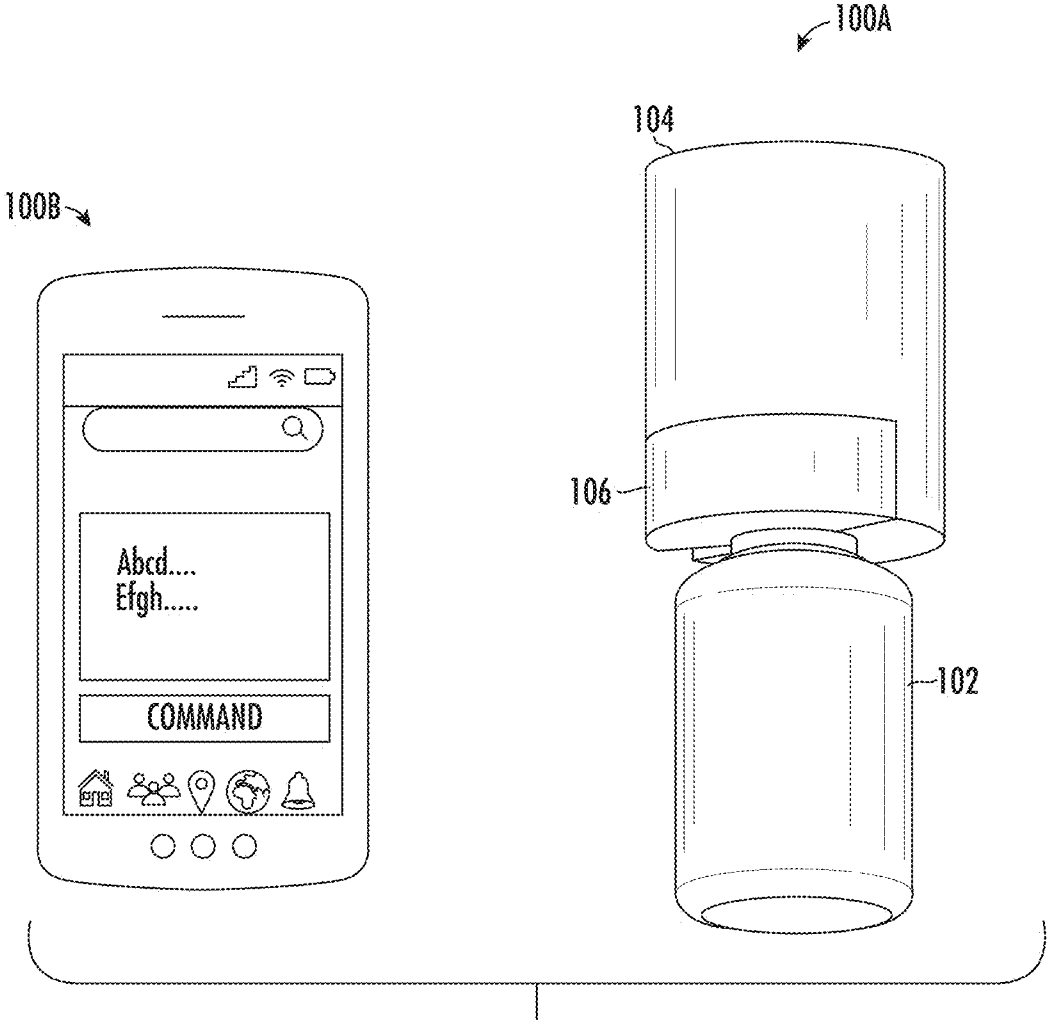
FIG. 1A depicts an exemplary item with a lock according to an exemplary embodiment of the invention.

Described herein is a technology with a system and a method for locking or unlocking an item coupled to a lock. The technology enables the integrity of items while they reach to different destinations or to end users. Different embodiments of the invention describe a housing comprising a cavity to receive an item. The cavity may be designed to receive the intended item. The housing further comprises an electronic circuit for receiving a command from a user terminal for locking or unlocking the item in the cavity. On receiving the command from the user terminal the electronic circuit actuates a motor. A housing lock is provided to lock or unlock the item in the cavity based on the actuation of the motor.

In the embodiments of the invention, housing is an enclosure where different components such as an electronic circuit, a motor, a battery and the like resides. The housing also comprises a cavity for receiving the item to be locked. The housing is fitted with the item, for example a vial and locked therein using the housing lock. The housing also includes a housing lock which is removable from the housing. The housing lock is fitted in the housing after placing the item in the cavity. The housing lock is rotated in anti-clockwise direction to fit in the cavity for locking. The housing lock is rotated in the clockwise direction to remove the housing lock from the cavity of the housing.

In an embodiment of the invention, the cavity of the housing may be of any shape such as circular, square, rectangular, and the like. The cavity is adapted to receive the item.

The housing lock may be applied at a designated position in the housing to lock the item therein.

In some embodiments of the invention, the electronic circuit comprises at least a receiver to receive a command from the user terminal. The electronic circuit also comprises a switch to actuate the motor for locking and unlocking the item. The electronic circuit may be mounted on a printed circuit board (PCB) and may be coupled with the motor. The electronic circuit may also include a processor, a memory to perform various operations. The receiver of the electronic circuit is communicably coupled with the user terminal. The user terminal sends a command which is received by the receiver of the electronic circuit. The electronic circuit receives the lock or unlock command from the user terminal. On receiving the command from the user terminal, the electronic circuit may determine whether the command is a "lock command" or an "unlock command." The electronic circuit may use the processor to determine the "lock command" or the "unlock command."

If the command is the "unlock command", the processor may instruct to rotate the shaft of the motor in the direction to disengage the shaft from the perforation of the housing lock to release the item. If the command is the "lock command", the processor may instruct to rotate the shaft of the motor in the direction to engage the shaft into the perforation of the housing lock to lock the item.

In an embodiment of the invention, the user terminal may be a desktop computer or a hand held device such as a mobile phone with network connectivity. Also, a user may be associated with the user terminal. Further, the user terminal may be connected with a server through a network. Examples of the user terminal may include a stand-alone device, a computer, a desktop, a workstation PC, a laptop, a smart phone, a tablet, a wearable device and the like. The user terminal may, at least, have a short range wireless communication capability.

The user terminal may be operated by a manufacturer of the item. The manufacturer may use the user terminal to send a lock command to the housing. On receiving the lock command, the electronic circuit may actuate a motor. The motor may move a shaft associated with the motor in a direction of a perforation associated with the housing lock. The shaft of the motor may be driven into the perforation to lock the item inside the cavity of the housing.

The motor described herein may be a DC motor receiving instructions from the processor for actuation. The processor provides instructions for motor to rotate the shaft of the motor. In an embodiment of the invention, the motor may be a stepper motor which may receive digital sequences from the processor for operation. The DC motor and the stepper motor are operated as known to a person skilled in the art. The motors described herein are not limited and various other motors known to person skilled in the art may also be used for operation.

There may be another user terminal operated by an end user. The end user may use another user terminal to unlock the item from the housing. The unlocking of the item may be performed when the user inputs an unlock command. The unlock command is sent to a receiver of the electronic circuit. On receiving the unlock command, the electronic circuit actuates the motor using the switch. The switch may be a semiconductor switch which operates under the control of the processor. The switch may be operable to direct the current into the motor such that it moves to engage with the perforation of the housing lock for locking or away from the perforation of the housing lock for unlocking. The motor rotates to disengage the shaft from the perforation of the housing. The housing lock may be removed to detach the item from the cavity of the housing.

In an embodiment of the invention, the lock and unlock command from the user terminal may be transmitted using a user application. The user application may be associated with the user credentials which may comprise, but is not limited to, a password, a personal identification number, a voice command, a biometric data or any such user credentials well known in the art.

The user terminal may use a wireless communication such as a personal area network for example, a Bluetooth network, a Wi-Fi network, a near-field network, or a ZigBee network. The electronic circuit in the housing may include a corresponding receiver to communicate with the user terminal. The user of the user terminal may send a command to lock or unlock the item using the communication network as described herein. The wireless communication may also be a cellular communication between the user terminal and the electronic circuit in the housing. The user terminal may use other various communication modes known to a person skilled in the art.

FIG. 1A depicts system 100A with a housing coupled to the item where the item is locked within the housing. The system comprises a housing 104 with a housing lock 106. An item 102 such as a vial and the like is locked within the housing. The housing lock 106 is removable only after an unlock command is received from a user terminal 100B. The housing comprises a cavity (not shown) which receives the item and the housing lock 106 is inserted after the item is received in the cavity. The housing lock 106 is fixed, thereby locking the item.

Figure 1B:
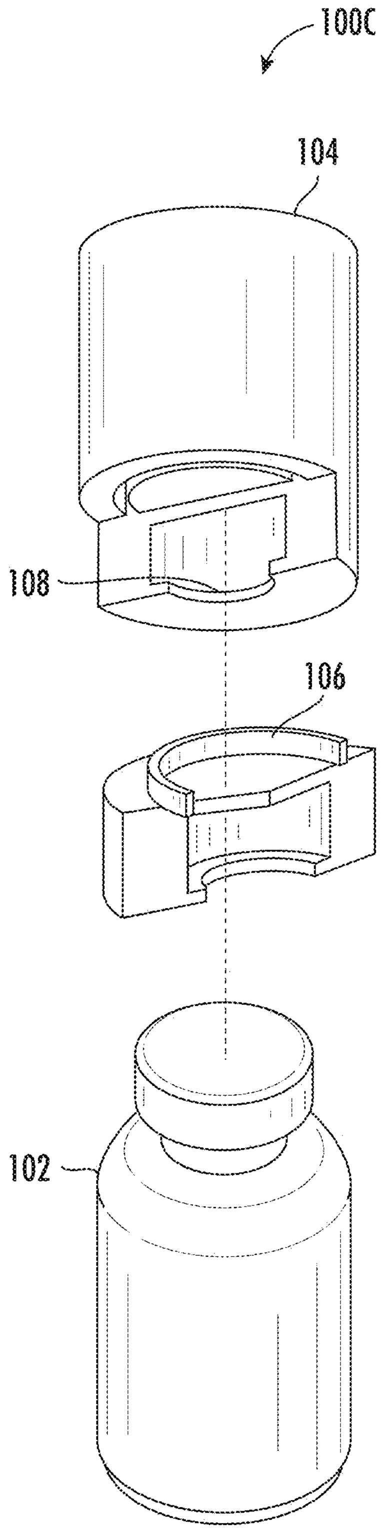
FIG. 1B depicts an exploded view of an exemplary item with a lock according to an exemplary embodiment of the invention.

FIG. 1B depicts an exploded view of the system 100C (same as 100A in FIG. 1A). Discrete components of the system are depicted. The housing 104 comprises electronic circuit, motor, battery, processor, memory and other components to perform the invention. On locking the item with the housing 104, the item is received in the cavity 108 shown at the bottom of the housing 104. After receiving the item in the cavity 108, a housing lock 106 is applied on the housing and inserted on the cavity for locking the item. On inserting the housing lock, the motor (not shown) inside the housing 104 actuates to lock the item. The shape and configuration of the cavity and the housing lock are such that they mate with each other such that the housing lock 106 fixes and locks the item 102. In an exemplary embodiment the housing to the lock the item is applied at the neck of the item so that the item may not be opened while the item is locked.

Figure 2:
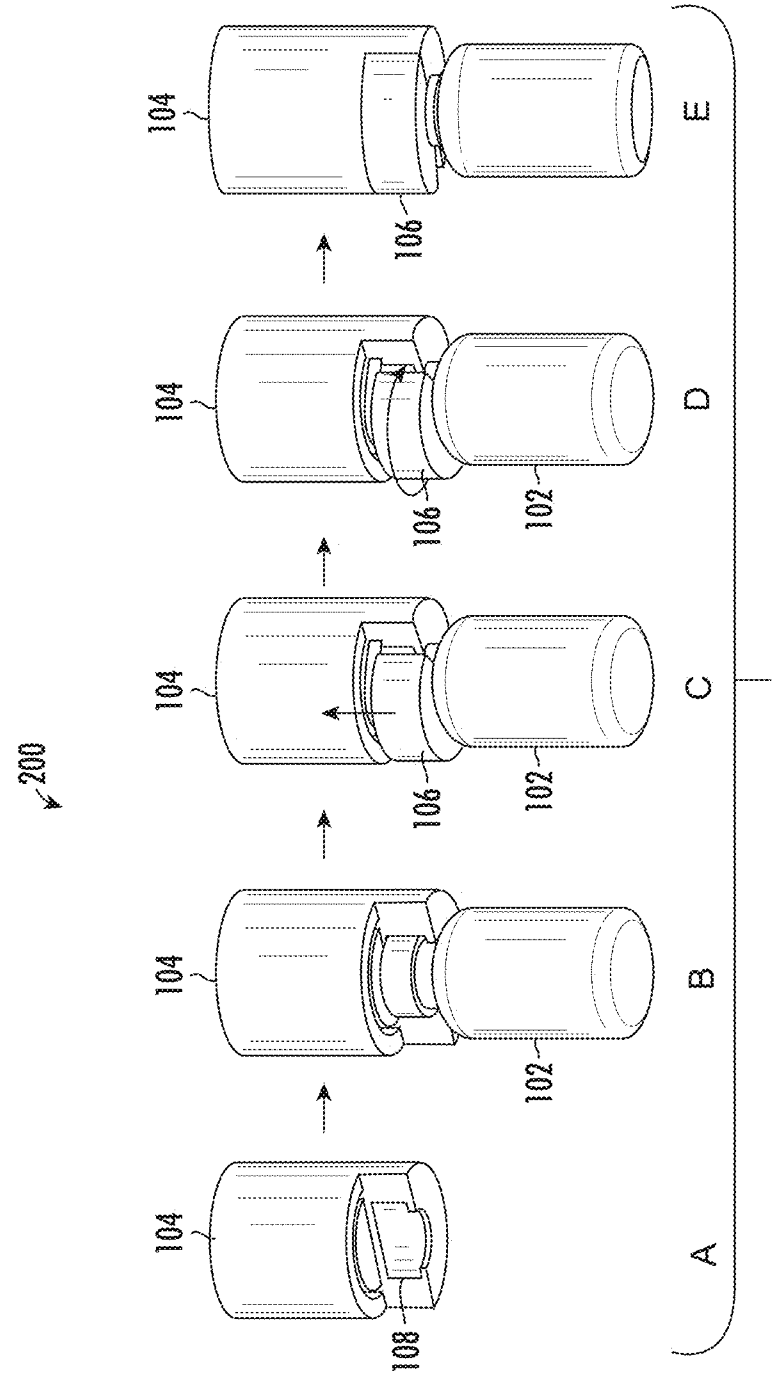
FIG. 2 depicts a procedure for locking of an item with a lock according to an exemplary embodiment of the invention.

Turning to FIG. 2 which depicts the steps to lock the item in the housing 104, the housing 104 is shown with cavity 108 at A. At B, the item 102 is received in the cavity 108 of the housing 104. The housing lock 106 is inserted in the cavity 108 such that it encloses the cavity with the item 102 inside the cavity 108 as shown at C. The housing lock 106 is then rotated in an anti-clockwise direction to cover the cavity with the item inside the cavity 108 as shown at D. The item 102 is locked inside the cavity of the housing 104 by action of a motor. As discussed above, a command is received from a user terminal 100B by an electronic circuit in the housing 104. The electronic circuit on receipt of the command activates a motor inside the housing. If the command is an unlock command, a shaft of the motor moves in the direction of the housing lock and engages with a perforation in the housing lock 106. Thus, the item gets locked at E.

Figure 3:
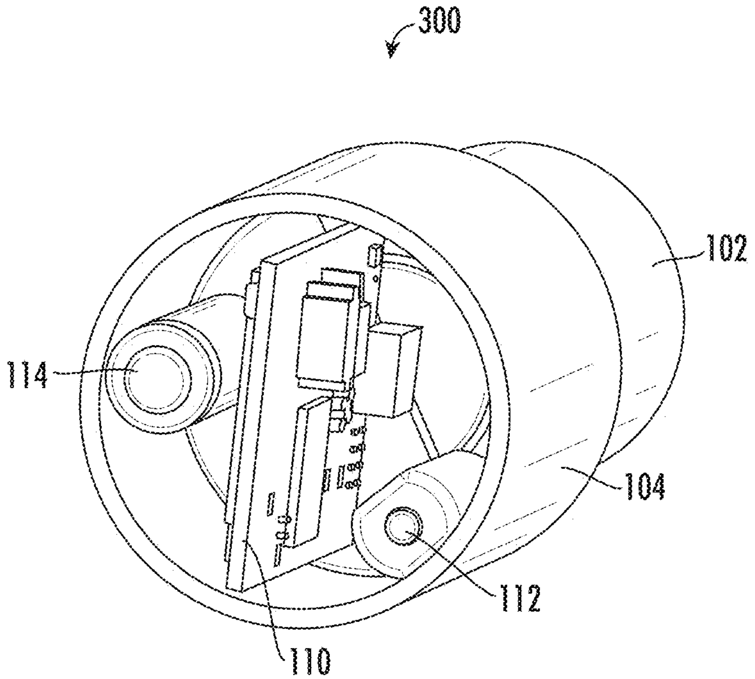
FIG. 3 depicts an inside view of an item according to an exemplary embodiment of the invention.

Referring to FIG. 3, provided is the inside view of the housing 104 with various components. The housing 104 comprises an electronic circuit 110 with various electronic elements such as resistances, capacitances, inductors and the like to operate the circuit. The different elements of the electronic circuit may be mounted on a printed circuit board (PCB). The electronic circuit 110 comprises at least a receiver to receive the command from the user terminal 100B, a processor to determine the command and to actuate the motor based on the command. The housing further comprises a battery 114 to provide power to the electronic circuit 110 and a motor 112. The motor 112 may be actuated with a switch by the electronic circuit 110. The switch may be a semiconductor switch which is automatically activated on receipt of the command from the user terminal by the electronic circuit 110. The item 102 is placed inside the cavity of the housing 104.

Figure 4:
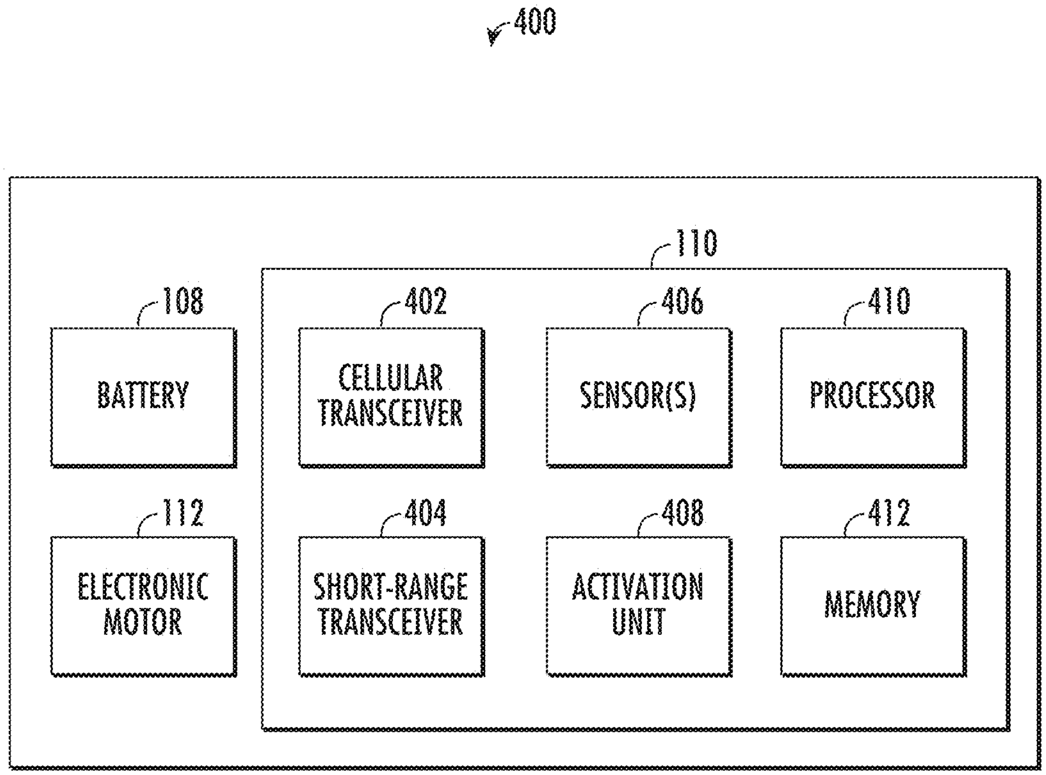
FIG. 4 depicts a block diagram of different components of an item according to an exemplary embodiment of the invention.

FIG. 4 discloses a block diagram 400 of the electronic components inside the housing. The electronic circuit 110 as described above comprises a cellular transceiver 402, short range transceiver 404 (for example, Bluetooth), one or more sensors 406, an activation unit 408, a processor 410, and a memory 412. The elements of the electronic circuit are not limited as described herein. The block diagram further describes a battery 114 and an electronic motor 112. In an exemplary embodiment, the battery 114 and the electronic motor 112 are placed adjacent to the electronic circuit 110. The short range receiver 404 may be a Bluetooth transceiver for communicating with the user terminal. The different units described herein are exemplary. The invention may be performed using one or more units. For example, the tasks executed by the transceiver 404, one or more sensors 406, an activation unit 408, a processor 410, and a memory 412 may be performed by a single unit. Alternatively more number of units as described herein may be used to perform the invention.

Figure 5A:
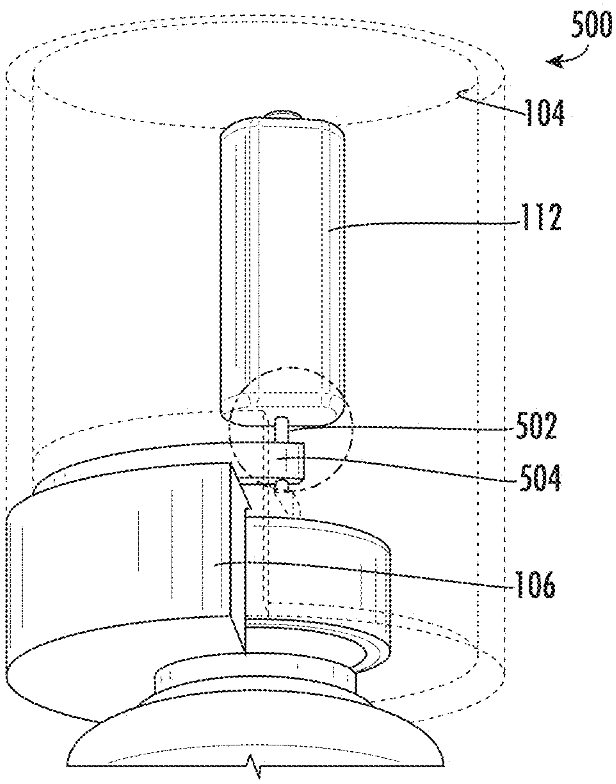
FIG. 5A depicts locking of an item and FIG. 5B depicts unlocking of an item according to exemplary embodiment/s of the invention.

FIG. 5A describes a transparent view of the housing 104 illustrating the operation of the motor 112 inside the housing 104 on receiving a command from a user terminal.

Figure 5B:
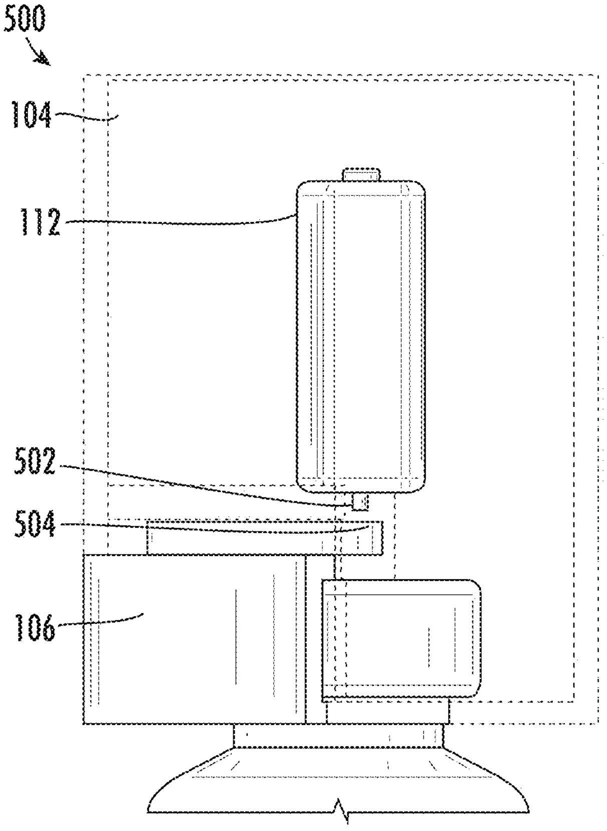

FIG. 5A depicts the item 102 locked within the cavity of the housing. The shaft 502 of the motor is engaged within a perforation 504 of the housing lock 106 thereby locking the item 102. FIG. 5B illustrates the shaft of the motor in disengaged state. On receiving an unlock command from the user terminal 100B, the electronic circuit 110 of the housing 104 sends a signal to the activation unit which determines that the shaft is required to be disengaged from the perforation 504. In other words, on receiving the unlock command the shaft moves in the upward direction to disengage from the perforation 504. The housing lock 106 is free and can be moved out from the cavity by rotating in the clockwise direction. The item is thus released from the cavity to be in unlocked state.

Figure 6:
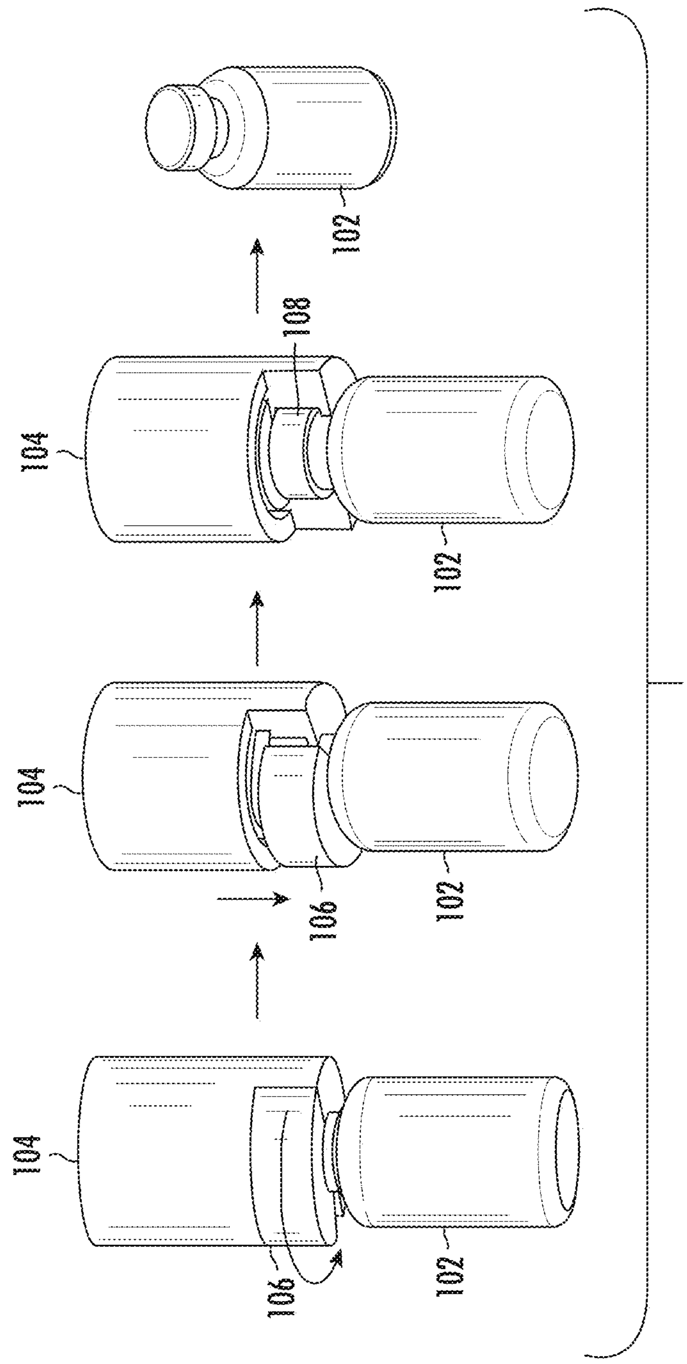
FIG. 6 depicts a procedure for unlocking a lock of an item according to an exemplary embodiment of the invention.

FIG. 6 illustrates unlocking of the item 102 from the housing 104. At A, it is shown that the item is in locked state. An unlock command is sent from the user terminal to the electronic circuit present inside the housing 104. As discussed above, the motor inside the housing is actuated and the shaft of the motor gets disengaged from the perforation of the housing lock 106. The housing lock 106 is turned in clockwise direction from the cavity 108 of the housing 104. Further at B, the housing lock is pushed downwards for removing the housing lock 106 from the cavity 108 of the housing. At C, it is depicted that the housing lock is removed from the housing. The housing lock may be removed manually. The item is finally de-coupled from the housing for further use, at D.

Figure 7:
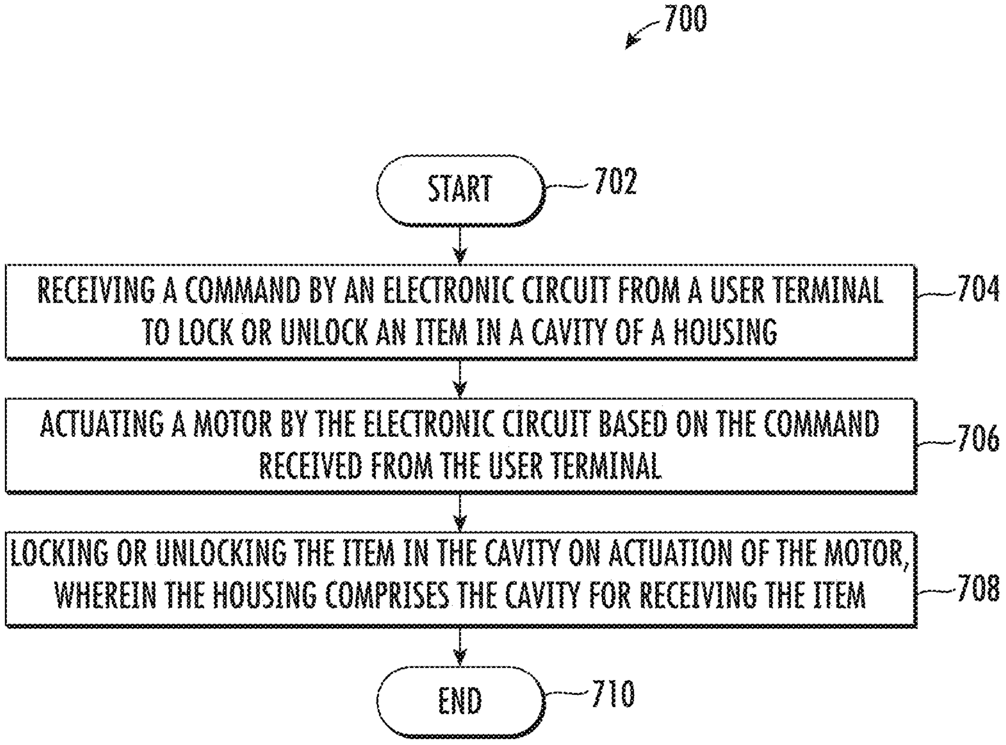
FIG. 7 depicts an exemplary flowchart illustrating a method to perform the invention according to an exemplary embodiment of the invention.

FIG. 7 depicts a flowchart to illustrate the method steps to perform the invention. The method, 700 starts at 702. At step 704, a command is received from a user terminal to lock or unlock an item in a cavity of a housing. As discussed above, the item is received in the cavity 108. The item may be either present in the cavity 108 and may be unlocked or the item may be received in the cavity 108 for locking. At step 706, on receiving the command from the user terminal, a motor is actuated. The motor is actuated on determination whether the command is a "lock command" or "unlock command". The determination of the command may be done by the processor. Depending upon the locking or unlocking of the item, the shaft for the motor is engaged or disengaged form a perforation of the housing lock 106, respectively at step 708. The engagement and disengagement of the shaft from the perforation is controlled by the electronic circuit 110 in the housing 104. The flowchart ends to step 710.

The present invention is applicable to various fields/industries such as, but not limited to, pharmaceuticals, food processing, logistics, and the like and not limited hereto and can be used and is obvious to a person skilled in the art.

The present invention provides the following technical advantages over the existing solutions that it provides tamperproof mechanism while ingredients such as medicines, food articles or other such products are transported from source to destination. It also provides integrity check while location of the item is being tracked. Further, since the items can be locked and unlocked using a command from a user terminal, it provides authorized access to the items. Moreover the locking and unlocking mechanism described herein is reusable and due to simplicity of the locking mechanism it is highly durable and reliable.

The embodiments of the invention discussed herein are exemplary and various modifications and alterations to a person skilled in the art are within the scope of the invention.

Although described in connection with an exemplary computing system environment, examples of the invention are capable of implementation with numerous other general purpose or special purpose computing system environments, configurations, or devices.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Furthermore, the terms "user terminal," "user device," "mobile device," "device," and the like are employed interchangeably throughout the subject specification. Moreover, "electronic device", electronic elements" or "electronic components" have been used interchangeably. Further the terms "lock" and "housing" have been used interchangeably. The terms are used interchangeably unless context warrants particular distinction(s) among the terms. Such terms can refer to human entities or automated components supported through artificial intelligence (e.g., a capacity to make inference based on complex mathematical formalisms) which can provide simulated vision, sound recognition and so forth.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A housing comprising:

a cavity adapted to receive an item inside the housing;

an electronic circuit for receiving a command from a user terminal to lock or unlock an item in the cavity of the housing;

a motor adapted to be actuated by the electronic circuit based on the command received from the user terminal;

a housing lock adapted to lock or unlock the item in the cavity on actuation of the motor, wherein the housing lock comprises a perforation to receive a shaft of the motor for locking the item, and wherein the housing lock is configured to be applied at a neck of the item so that the item cannot be opened when the item is locked;

wherein the cavity is a semi-circular cavity formed in the housing shaped to receive a portion of the neck of the item;

wherein the housing lock is semi-circular shaped to receive a second portion the neck of the item;

wherein the housing lock is configured to be inserted into the cavity and rotated relative to the cavity to cover the cavity with the neck of the item inside the cavity.

2. The housing of claim 1, wherein the command is a lock or unlock command received from the user terminal through a short-range network.

3. The housing of claim 2, wherein the user terminal transmits the command to lock the housing when a user of the user terminal transmits the lock command from a user application.

4. The housing of claim 1, wherein the shaft of the motor is disengaged from the perforation on receiving an unlock command from the user terminal.

5. The housing of claim 4, wherein the housing lock is rotated in anti-clockwise direction and then the shaft of the motor is engaged with the perforation on receiving the lock command.

6. The housing of claim 1, wherein the shaft of the motor is engaged with the perforation on receiving a lock command from the user terminal.

7. The housing of claim 6, wherein the housing lock is rotated in clockwise direction after the shaft of the motor is disengaged from the perforation on receiving the unlock command.

8. The housing of claim 1, wherein the motor is a stepper motor.

9. The housing of claim 1, wherein the shaft is movably connected in vertical direction relative to the housing lock.

10. The housing of claim 1, wherein the housing further comprises a battery to power the electronic circuit and the motor.

11. The housing of claim 1, wherein the user terminal for locking the item is different from the user terminal for unlocking the item.

* * * * *